US012781163B2

(12) United States Patent
Nishibori et al.

(10) Patent No.: US 12,781,163 B2
(45) Date of Patent: Nov. 3, 2026

(54) EXTRACT, METHOD FOR PRODUCING SAME, AND USE THEREOF

(71) Applicant: SUNTORY HOLDINGS LIMITED, Osaka (JP)

(72) Inventors: Tomoyuki Nishibori, Kanagawa (JP); Akira Yoshihiro, Kanagawa (JP)

(73) Assignee: SUNTORY HOLDINGS LIMITED, Osaka (JP)

( * ) Notice: Subject to any disclaimer, the term of this patent is extended or adjusted under 35 U.S.C. 154(b) by 517 days.

(21) Appl. No.: 18/268,521

(22) PCT Filed: Dec. 15, 2021

(86) PCT No.: PCT/JP2021/046214

§ 371 (c)(1),
(2) Date: Jun. 20, 2023

(87) PCT Pub. No.: WO2022/138366

PCT Pub. Date: Jun. 30, 2022

(65) Prior Publication Data

US 2024/0076590 A1 Mar. 7, 2024

(30) Foreign Application Priority Data

Dec. 21, 2020 (JP) ................................ 2020-211383

(51) Int. Cl.

| | |
|---|---|
| ***C12G 3/06*** | (2006.01) |
| ***A23L 2/54*** | (2006.01) |
| ***C12H 6/02*** | (2019.01) |

(52) U.S. Cl.

CPC .................. *C12G 3/06* (2013.01); *A23L 2/54* (2013.01); *C12H 6/02* (2019.02)

(58) Field of Classification Search

CPC ... A23L 2/54; A23L 2/56; A23L 27/88; C12H 6/02; C12G 3/021; C12G 3/04; C12G 3/06

See application file for complete search history.

(56) References Cited

U.S. PATENT DOCUMENTS

2015/0259634 A1* 9/2015 Marcq ........................ A23L 2/56 426/534

FOREIGN PATENT DOCUMENTS

| | | | |
|---|---|---|---|
| JP | 2004-80 | A | 1/2004 |
| JP | 2007-159503 | A | 6/2007 |
| JP | 2013-42751 | A | 3/2013 |
| JP | 2016-54662 | A | 4/2016 |
| JP | 2018-7643 | A | 1/2018 |
| JP | 2020-130110 | A | 8/2020 |
| KR | 10-1272285 | B1 | 6/2013 |
| KR | 10-2015-0124284 | A | 11/2015 |

OTHER PUBLICATIONS

International Search Report dated Mar. 1, 2022, issued in counterpart International Application No. PCT/JP2021/046214. (3 pages).

Piornes Jose A. et al., Elucidating the Odor-Active Aroma Compounds in Alcohol-Free Beer and Their Contribution to the Worty Flavor, Journal of Agricultural and Food Chemistry, 2020, vol. 68, No. 37, p. 10088-10096; Cited in Extended Supplementary European Search Report dated Sep. 26, 2024. (9 pages).

Gerogiannaki-Christopoulpo, Development for a procedure for the determination of 2-phenylethanol in Hellenic wine distillates (*Vitis vinifera* L.) and their changes during distillation, J. Int. Sci. Vigne Vin, 2009, vol. 43, No. 3, p. 171-178; Cited in Extended Supplementary European Search Report dated Sep. 26, 2024. (8 pages).

Extended Supplementary European Search Report dated Sep. 26, 2024, issued in counterpart Application No. 21910514.5. (10 pages).

* cited by examiner

*Primary Examiner* — Vera Stulii
(74) *Attorney, Agent, or Firm* — WHDA, LLP

(57) ABSTRACT

An object of the present invention is to provide an extract capable of contributing to the improvement of the liquor taste of a beverage. The extract contains phenethyl alcohol and acetaldehyde, wherein a ratio of phenethyl alcohol content to acetaldehyde content (phenethyl alcohol content/acetaldehyde content) is 14 to 1,000.

21 Claims, No Drawings

EXTRACT, METHOD FOR PRODUCING SAME, AND USE THEREOF

TECHNICAL FIELD

The present invention relates to a novel extract, a method for producing the same, and use thereof, and in particular to a novel extract that can be used to give a liquor taste to a beverage.

BACKGROUND ART

An extract is an ingredient commonly used in the beverage field. There are various methods for producing an extract, and typically, the original material (animal or plant) is treated with a solvent such as water or alcohol to extract the desired component, which is then concentrated to a necessary degree. By using an extract in the production of a beverage, it is possible to obtain a beverage with desired aroma, taste, and nutrient given or enhanced. For this reason, in development of beverages, the use of an extract can be as a means for increasing the added value of beverages, differentiate them from existing products, or the like. For example, PTL 1 discloses that an extract substantially free of alcohol is prepared from plum liquor, and the extract is used to provide a beverage that is non-alcoholic and yet has the unique flavor to be enjoyed of plum liquor.

CITATION LIST

Patent Literature

[PTL 1] Japanese Patent Laid-Open No. 2013-42751

SUMMARY OF INVENTION

Technical Problem

The inventors of the present application have conducted research on improving a liquor taste of a beverage. The inventors focused on an extract as a means for achieving the improvement of the liquor taste, and evaluated various extracts. However, they have not found any extracts that serves the purpose. An object of the present invention is to provide an extract capable of contributing to the improvement of the liquor taste of a beverage.

Solution to Problem

In view of the above situation, the inventors of the present application have focused on components that constitute the flavor of alcoholic drinks. As a result of their diligent study, the inventors have found, among the wide variety of components present in alcoholic drinks, components that serve as an indicator of the liquor taste and confirmed that an extract in which such components are present in an appropriate ratio or content improves the liquor taste of a beverage. On the basis of such a finding, the present invention has been completed.

The present invention provides, but is not limited to, the following.

(1) An extract containing phenethyl alcohol and acetaldehyde, wherein a ratio of phenethyl alcohol content to acetaldehyde content (phenethyl alcohol content/acetaldehyde content) is 14 to 1,000.

(2) The extract according to (1), having a phenethyl alcohol content of 50 ppm to 1,000 ppm.

(3) The extract according to (1) or (2), having an acetaldehyde content of 1 ppm to 500 ppm.

(4) The extract according to any one of (1) to (3), further containing acetic acid at 100 ppm to 600 ppm.

(5) The extract according to any one of (1) to (4), having a pH of 4.5 or less.

(6) The extract according to any one of (1) to (5), having a Brix of less than 8.0.

(7) The extract according to any one of (1) to (6), which is an extract selected from the group consisting of distilled liquor, brewed liquor, and mixed liquor.

(8) The extract according to (7), in which the distilled liquor is shochu (Japanese distilled spirit) or whisky.

(9) The extract according to (8), in which the shochu (Japanese distilled spirit) is mugi shochu (Japanese distilled spirit made from barley).

(10) The extract according to any one of (1) to (9), which is a liquor-taste improving agent.

(11) The extract according to any one of (1) to (10), which is an astringent-taste improving agent.

(12) A method for producing an extract, comprising the steps of:

distilling an alcoholic drink under reduced pressure, and obtaining a residual liquid resulting from the reduced-pressure distillation.

(13) The production method according to (12), in which the residual liquid is prepared without adding water.

(14) The production method according to (12) or (13), in which the alcoholic drink is selected from the group consisting of distilled liquor, brewed liquor, and mixed liquor.

(15) The production method according to (14), in which the distilled liquor is shochu (Japanese distilled spirit) or whisky.

(16) The production method according to (15), in which the shochu (Japanese distilled spirit) is mugi shochu (Japanese distilled spirit made from barley).

(17) The production method according to any one of (12) to (16), in which the reduced-pressure distillation is performed under conditions of a pressure in a vessel of 300 mmHg or less and a distillation temperature of 20 to 60° C.

(18) The production method according to any one of (12) to (17), in which the reduced-pressure distillation is performed such that the residual liquid has an alcohol content of 1% (v/v) or less.

(19) The production method according to any one of (12) to (18), in which the reduced-pressure distillation is performed such that the residual liquid has an alcohol content of 1% (v/v) to 60% (v/v).

(20) The production method according to any one of (12) to (18), for producing the extract according to any one of (1) to (11).

(21) A method for producing a beverage, comprising the step of blending an extract obtained by the method for producing an extract according to any one of (12) to (20).

(22) A beverage containing the extract according to any one of (1) to (11).

(23) The beverage according to (22), which is a non-alcoholic beverage.

(24) The beverage according to (22) or (23), which is a carbonated beverage.

DESCRIPTION OF EMBODIMENTS

The present invention provides an extract. The extract is derived from an alcoholic drink. For example, the extract may be an extract of an alcoholic drink. As used herein, the alcoholic drink means a beverage containing alcohol. The alcoholic drink may be either an alcoholic drink generally available or an alcoholic drink produced by a known or novel means. Examples of the alcoholic drink include, but are not limited to, distilled liquor, brewed liquor, and mixed liquor. It can be understood that the extract of the present invention encompasses one or more extracts selected from the group consisting of an extract of distilled liquor, an extract of brewed liquor, and an extract of mixed liquor.

The distilled liquor broadly encompasses products recognized by those skilled in the art as distilled liquor. Examples of the distilled liquor include, but are not limited to, shochu (Japanese distilled spirit) (e.g., mugi shochu (Japanese distilled spirit made from barley), soba shochu (Japanese distilled spirit made from sweet potato), kome shochu (Japanese distilled spirit made from rice), kokuto shochu (Japanese distilled spirit made from brown sugar), svba shochu (Japanese distilled spirit made from buckwheat)), whisky (which may encompass whiskey in the present application), brandy, vodka, gin, rum, tequila, and awamori (Okinawa's distilled spirit). The brewed liquor broadly encompasses products recognized by those skilled in the art as brewed liquor. Examples of the brewed liquor include, but are not limited to, beer, whisky, wine, and Japanese sake. The mixed liquor broadly encompasses products recognized by those skilled in the art as mixed liquor. Examples of the mixed liquor include, but are not limited to, plum liquor, liqueur, sherry, and vermouth.

The extract of the present invention contains phenethyl alcohol and acetaldehyde. Although phenethyl alcohol and acetaldehyde might be present in certain alcoholic drinks, their relationship with liquor-taste in alcoholic drinks was unknown. The inventors of the present application have revealed that phenethyl alcohol and acetaldehyde can be used as indicator components of alcoholic drinks. Thus, these components have significance for the extract of the present invention as indicator components for improving the liquor taste. The extract of the present invention contains phenethyl alcohol and acetaldehyde in specific proportions. Regarding the extract of the present invention, for example, the ratio of phenethyl alcohol content to acetaldehyde content (phenethyl alcohol content/acetaldehyde content) can be 14 or more, 14 to 1,000, 20 to 900, 25 to 800, 30 to 700, 35 to 600, 40 to 500, 45 to 400, or 50 to 300. For example, the lower limit thereof may be 14 or more, 20 or more, 25 or more, 30 or more, 35 or more, 40 or more, 45 or more, or 50 or more. Alternatively, in addition to any of the lower limits, the upper limit thereof may be 1,000 or less, 800 or less, 600 or less, 400 or less, or 300 or less.

Moreover, the extract of the present invention can contain phenethyl alcohol and/or acetaldehyde in specific amounts.

The extract of the present invention may have a phenethyl alcohol content of 50 ppm to 1,000 ppm, 100 ppm to 900 ppm, 150 ppm to 800 ppm, 200 ppm to 700 ppm, 250 ppm to 600 ppm, or 300 ppm to 500 ppm. For example, the lower limit thereof may be 50 ppm or more, 100 ppm or more, 200 ppm or more, 250 ppm or more, 300 ppm or more, or 350 ppm or more, and the upper limit thereof may be 1,000 ppm or less, 800 ppm or less, 600 ppm or less, or 500 ppm or less. The phenethyl alcohol in the extract can be derived at least in part from a source alcoholic drink. For example, 20% or more, 50% or more, 95% or more, or 100% (all) of phenethyl alcohol in the extract can be derived from the source alcoholic drink. The identification or quantification of phenethyl alcohol can be performed by any method, and examples thereof include methods described in Examples below.

The extract of the present invention may have an acetaldehyde content of 500 ppm or less, 1 ppm to 500 ppm, 30 ppm to 450 ppm, 60 ppm to 400 ppm, 90 ppm to 350 ppm, 120 ppm to 300 ppm, or 150 ppm to 200 ppm. For example, the upper limit thereof may be 200 ppm or less, 150 ppm or less, 100 ppm or less, 50 ppm or less, 40 ppm or less, 30 ppm or less, or 20 ppm or less. Alternatively, in addition to any of the upper limits, the lower limit thereof may be 0.01 ppm or more, 0.1 ppm or more, 1 ppm or more, 5 ppm or more, or 10 ppm or more. The acetaldehyde in the extract can be derived at least in part from a source alcoholic drink. For example, 20% or more, 50% or more, 95% or more, or 100% (all) of acetaldehyde in the extract can be derived from the source alcoholic drink. The detection or measurement of acetaldehyde can be performed by any method, and examples thereof include methods described in Examples below.

The extract of the present invention can further contain acetic acid in a specific amount. Acetic acid can be used as an additional indicator component for improving the liquor taste in the extract of the present invention. The extract may have an acetic acid content of 100 ppm to 600 ppm, 150 ppm to 550 ppm, 200 ppm to 500 ppm, 250 ppm to 450 ppm, or 300 ppm to 400 ppm. The acetic acid in the extract can be derived at least in part from a source alcoholic drink. For example, 20% or more. 50% or more, 95% or more, or 100% (all) of acetic acid in the extract can be derived from the source alcoholic drink. The detection or measurement of acetic acid can be performed by any method, and examples thereof include methods described in Examples below.

The extract of the present invention contains alcohol. In this respect, it is distinctly different from known extracts that are free or substantially free of alcohol. However, the alcohol content of the extract of the present invention is lower than that of the alcoholic drink used as an ingredient. For example, the extract of the present invention may have an alcohol content of 0.02 to 1.0% (v/v), 0.2% (v/v) to 0.8% (v/v), 0.25% (v/v) to 0.75% (v/v), 0.30% (v/v) to 0.70% (v/v), 0.35% (v/v) to 0.65% (v/v), 0.40% (v/v) to 0.60% (v/v), or 0.45% (v/v) to 0.55% (v/v). Alternatively, the extract of the present invention may have an alcohol content of 1% (v/v) to 60% (v/v), 5% (v/v) to 55% (v/v), 10% (v/v) to 50% (v/v), 15% (v/v) to 45% (v/v), 20% (v/v) to 40% (v/v), or 25% (v/v) to 35% (v/v). Complete or substantial removal of alcohol may be undesirable from the aspect of flavor, for example, a burnt odor. The alcohol in the extract can be derived at least in part from a source alcoholic drink. For example, 20% or more, 50% or more, 95% or more, or 100% (all) of alcohol in the extract can be derived from the source alcoholic drink. As used herein, the term "alcohol" simply means "ethanol", and "alcohol" and "ethanol" are interchangeable. Alcohol can be measured by methods known to those skilled in the art. For example, the measurement can be performed by methods described in Examples below. Note that "alcohol content" is synonymous with "percentage of alcohol".

The extract of the present invention can have any pH. The pH of the extract may be, but not limited to, pH 7.0 or less, pH 6.0 or less, pH 4.5 or less, pH 4.4 or less, pH 4.3 or less, pH 4.2 or less, pH 4.1 or less, or pH 4.0 or less. In addition, the lower limit of pH may be pH 2.5 or more, pH 3.0 or more, and pH 3.5 or more. It should be understood that a method of measuring pH is very well known and requires no explanation.

The extract of the present invention can have any Brix. As used herein, Brix means, unless otherwise specified, a value obtained by converting the weight (g) of a soluble solid per 100 g of a solution to grams of sucrose contained in 100 g of syrup based on the refractive index of the solution. The Brix of the extract may be, but not limited to, less than 8.0, less than 7.0, or less than 6.0. The Brix can be measured with a commercially available Brix meter.

The extract of the present invention may further contain components other than those described above. The components may be derived from the source alcoholic drink or may not be derived from the source alcoholic drink. Examples of such components include, but are not limited to, flavors, vitamins, pigments, antioxidants, acidulants, emulsifiers, preservatives, seasonings, and pH adjusters. However, it should be understood that these components can be present in the extract as long as the extract of the present invention exerts the effect of improving the liquor taste of the beverage.

The extract of the present invention can be obtained, for example, by a production method comprising the step of distilling an alcoholic drink as an ingredient under reduced pressure to thereby obtain a residual liquid. The reduced-pressure distillation can be performed under conditions of a pressure in a vessel of 300 mmHg or less and a distillation temperature of 20 to 60° C., but is not limited thereto. In other words, the conditions for reduced-pressure distillation can be set in consideration of the alcoholic drink to be used as an ingredient, the amount charged thereof, the capacity of the distillation equipment, the production schedule, and the like. Those skilled in the art also understand that the conditions for reduced-pressure distillation can be set based on knowledge obtained from preliminary tests or past production results. The reduced-pressure distillation is performed so that the indicator component in the residual liquid has the desired content or ratio. This can be achieved, for example, by monitoring a change in the content of indicator components in the residual liquid during reduced-pressure distillation. During reduced-pressure distillation, the component in which the change in the content of the residual liquid is to be monitored can be at least one selected from the group consisting of phenethyl alcohol, acetaldehyde, acetic acid, and alcohol. During reduced-pressure distillation, for example, the change in the phenethyl alcohol content in the residual liquid can be monitored, and the phenethyl alcohol content in the residual liquid after reduced-pressure distillation can be adjusted to the above content. During reduced-pressure distillation, for example, the change in the acetaldehyde content in the residual liquid can be monitored, and the acetaldehyde content in the residual liquid after reduced-pressure distillation can be adjusted to the above content. During reduced-pressure distillation, for example, the change in the acetic acid content in the residual liquid can be monitored, and the acetic acid content in the residual liquid after reduced-pressure distillation can be adjusted to the above content. During reduced-pressure distillation, for example, the change in the alcohol content in the residual liquid can be monitored, and the alcohol content in the residual liquid after reduced-pressure distillation can be adjusted to the above content. It should be understood that if the change behavior in the content of each component in the residual liquid is clarified when the reduced-pressure distillation is performed under the conditions set for a specific alcoholic drink, the change in the content of any one of the components (e.g., alcohol) in the residual liquid can be monitored in the subsequent production to estimate the change in the content of the other components (such as phenethyl alcohol, acetaldehyde, and/or acetic acid) in the residual liquid. In addition, by accumulating production results under such conditions, it may be possible to adjust the content of components in the residual liquid to the desired content simply by controlling the time of reduced-pressure distillation, without monitoring changes in the content of components in the residual liquid.

In the method of producing the extract of the present invention, a step of blending components other than those derived from the source alcoholic drink into the residual liquid can be further performed, if necessary, but it is preferable not to perform this step. For example, the production method preferably does not involve the step of blending phenethyl alcohol. For example, the production method preferably does not involve the step of blending acetaldehyde. For example, the production method preferably does not involve the step of blending acetic acid. For example, the production method preferably does not involve the step of blending alcohol. For example, the production method preferably does not involve the step of blending other components (e.g., flavors, vitamins, pigments, antioxidants, acidulants, emulsifiers, preservatives, seasonings, pH adjusters). For example, the production method preferably does not involve the step of adding water. For example, the step of adding water to the residual liquid is not performed for the purpose of adjusting a parameter in the extract of at least one element selected from the group consisting of phenethyl alcohol, acetaldehyde, acetic acid, alcohol, and Brix. That is, the extract of the present invention may be characterized as the residual liquid itself obtained by distilling an alcoholic drink under reduced pressure.

The extract of the present invention can also be stored for any period, if necessary. Preservation of the extract is advantageous in that the extract can be used immediately when the extract is needed to produce a beverage. Storage conditions are not particularly limited, but storage at a temperature lower than 25° C. is preferred. For example, the extract can be stored in a temperature-controlled storage container. The extract of the present invention may be sterilized, but it should be sterilized under conditions that do not impair the effect of the invention. Alternatively, the extract may be unsterilized.

The extract of the present invention can be used as an ingredient of a beverage, that is, a beverage can be produced by combining the extract with other ingredients. Such a beverage is also an object of the present invention. The proportion of the extract of the present invention in the beverage of the present invention can be set to, but is not limited to, 0.001% (v/v) to 50% (v/v), 0.005% (v/v) to 40% (v/v), 0.01% (v/v) to 30% (v/v), 0.05% (v/v) to 20% (v/v), 0.1% (v/v) to 10% (v/v), or 0.5% (v/v) to 1% (v/v). The beverage may be either an alcoholic beverage or a non-alcoholic beverage. The beverage may also be either a carbonated beverage or a non-carbonated beverage. Examples of the alcoholic beverage include, but are not limited to, alcoholic beverages having at least one alcohol-like flavor (flavor that is reminiscent of the alcoholic drink or intended to approximate the flavor of the alcoholic drink) selected from the group consisting of distilled liquor (e.g., shochu (Japanese distilled spirit), whisky, brandy, vodka, gin, rum, tequila, awamori (Okinawa's distilled spirit)), brewed liquor (e.g., beer, whisky, wine, Japanese sake), and mixed liquor (e.g., plum liquor, liqueur, sherry, and vermouth). The alcohol content of the alcoholic beverage can be appropriately set and may be set to, for example, 1% (v/v) to 45% (v/v), 3% (v/v) to 30% (v/v), 5% (v/v) to 20% (v/v), or 10% (v/v) to 15% (v/v). The non-alcoholic beverage is a beverage that is free or substantially free of alcohol, and more specifically, a beverage having an alcohol content of less than 0.05% (v/v) to 0.00% (v/v). Examples of the non-alcoholic beverage include, but are not limited to, a non-alcoholic beverage having a flavor that is reminiscent of the above-mentioned alcoholic drink or intended to approximate the flavor of the alcoholic drink, a fruit juice beverage, a carbonated beverage, a tea beverage, and a coffee beverage. The beverage of the present invention can be applied to, but not limited to, a beverage that claims low alcohol, a beverage that claims no alcohol, a beverage that claims zero alcohol, a beverage that claims alcohol free, or a beverage that claims alcohol taste.

The beverage obtained by using the extract of the present invention can be filled into a container to make a packaged form. The container is not limited in any form and can be provided in the form of, for example, a plastic-based container, a metal can, a laminated paper container layered with metal foil or plastic film, and a glass bottle.

The beverage obtained by using the extract of the present invention has an improved liquor taste as compared with a beverage obtained without using the extract. The term "liquor taste" herein refers to a liquor-like flavor that is felt upon drinking an alcoholic drink, and can be evaluated from the viewpoints of matured aroma, fermentation aroma, and complex taste. The term "improving" with respect to the liquor taste of a beverage encompasses imparting a liquor taste to a beverage that does not have an liquor taste, or enhancing or strengthening the liquor taste of a beverage that has a liquor taste. Thus, the extract of the present invention can be used as an agent for improving the liquor taste of a beverage.

The present invention will be described in more detail with reference to the following Examples, which are provided for the purpose of understanding the present invention and are not intended to limit the scope of the present invention.

EXAMPLES

Example 1

The effect of the ratio of phenethyl alcohol content to acetaldehyde content (phenethyl alcohol content/acetaldehyde content) of the extract was examined on the flavor of a beverage.

Mugi shochu (Japanese distilled spirit made from barley) (percentage of alcohol: 44.1% (v/v), sample No. 1) was distilled under reduced pressure to produce shochu (Japanese distilled spirit) extracts, which served as samples (No. 2 to 10). The phenethyl alcohol content, acetaldehyde content, and the ratio of phenethyl alcohol content to acetaldehyde content of the shochu (Japanese distilled spirit) (sample No. 1) or shochu (Japanese distilled spirit) extracts (sample Nos. 2 to 10) were shown in Table below.

Each of the samples 1 to 10 was added to non-alcoholic lemon sour at 0.1% (v/v). The percentage of alcohol of the non-alcoholic lemon sour was at least 0.0441% (v/v) or less. The non-alcoholic lemon sour was subjected to sensory evaluation by trained professional panelists. The samples were taken and evaluated on a four-grade scale to see whether the imparting of liquor taste was felt.

1 point: No liquor taste was imparted
2 points: Liquor taste was imparted
3 points: Strong liquor taste was imparted
4 points: Stronger liquor taste was imparted

TABLE 1

| Sample No. | 1 | 2 | 3 | 4 | 5 | 7 | 8 | 9 | 10 |
|---|---|---|---|---|---|---|---|---|---|
| Phenethyl alcohol (ppm) | 122.8 | 160.3 | 140.1 | 200.2 | 273.0 | 289.1 | 358.1 | 371.6 | 392.8 |
| Acetaldehyde (ppm) | 66.1 | 11.6 | 8.9 | 7.3 | 6.9 | 5.4 | 7.6 | 7.4 | 6.9 |
| Phenethyl alcohol/acetaldehyde | 1.9 | 13.8 | 15.7 | 27.4 | 39.9 | 54.0 | 47.0 | 50.4 | 57.1 |
| Evaluation | 1.0 | 1.5 | 2.1 | 3.0 | 3.5 | 3.6 | 4.0 | 4.0 | 4.0 |

Alternatively, the beverage obtained by using the extract of the present invention has an improved astringent-taste as compared with a beverage obtained without using the extract. The term "astringent taste" refers to a bitter and astringent taste that tightens the tongue and throat. The term "improving" with respect to the astringent taste of a beverage encompasses at least reducing the astringent taste of a beverage that has an astringent taste. Thus, the extract of the present invention can be used as an agent for improving the astringent taste of a beverage.

The extract, the agent for improving the liquor taste of a beverage, and the agent for improving the astringent taste of a beverage of the present invention may be in any form such as a liquid, a gas, or a solid, but are preferably in a liquid form from the viewpoint of ease of handling and preparation.

The effect of improving the liquor taste or astringent taste of a beverage by the extract of the present invention can be tested by sensory evaluation. For example, a beverage is produced using the extract, and the beverage is subjected to sensory evaluation. The sensory evaluation is performed by a plurality of trained professional panelists. The panelists taste and evaluate the beverage. A more detailed description is provided in Examples described below.

The evaluation shown in the Table is an average score of the evaluation by the professional panelists. An average score of 1.5 or more was considered acceptable.

In the case of a sample having a large ratio of phenethyl alcohol content to acetaldehyde content (phenethyl alcohol content/acetaldehyde content), liquor taste is imparted, while in the case of a small value, liquor taste is not imparted. Therefore, this ratio is a very effective indicator.

It was shown that a liquor taste was given to the non-alcoholic beverage by using an extract having a ratio of phenethyl alcohol content to acetaldehyde content (phenethyl alcohol content/acetaldehyde content) of 14 or more.

Example 2

The effect of the alcohol content of the extract was examined on the flavor of a beverage.

Mugi shochu (Japanese distilled spirit made from barley) (percentage of alcohol: 44.1% (v/v)) was distilled under reduced pressure to produce shochu (Japanese distilled spirit) extracts, which served as samples (Nos. 11 and 12). The alcohol content, phenethyl alcohol content, acetaldehyde content, and the ratio of phenethyl alcohol content to acetaldehyde content of the shochu (Japanese distilled spirit) extracts (sample Nos. 11 and 12) were shown in Table below.

Each of the samples 11 and 12 was added to non-alcoholic lemon sour at 0.1% (v/v). The percentage of alcohol in the non-alcoholic lemon sour was shown in Table below. This was used as a sensory evaluation object. The sensory evaluation was performed according to the method of Example 1.

TABLE 2

| Sample No. | 11 | 12 |
|---|---|---|
| Alc content of extract (%, v/v) | 0.91% | 0.05% |
| Phenethyl alcohol (ppm) | 323.8 | 387.7 |
| Acetaldehyde (ppm) | 6.7 | 7.4 |
| Phenethyl alcohol/acetaldehyde | 48.6 | 52.6 |
| Alc content of sensory evaluation object with 0.1% of the above extract added (%, v/v) | 0.0009% | 0.00005% |
| Evaluation | 4.0 | 3.9 |

Alc.: Alcohol

In this experiment, it was also shown that a liquor taste was given to the non-alcoholic beverage by using an extract having a ratio of phenethyl alcohol content to acetaldehyde content (phenethyl alcohol content/acetaldehyde content) of 14 or more. Moreover, it was shown that the alcohol content of the extract had little effect on the imparting of liquor taste to the beverage.

Example 3

The effect of the ratio of phenethyl alcohol content to acetaldehyde content (phenethyl alcohol content/acetaldehyde content) of the extract was examined on the flavor of a beverage.

Three types of whisky (each having an alcohol percentage of 44.1% (v/v), samples 1 to 3) were distilled under reduced pressure to produce whisky extracts. The whisky extract obtained from sample 1 was designated as sample 4, the whisky extract obtained from sample 2 was designated as sample 5, and the whisky extract obtained from sample 3 was designated as sample 6. The phenethyl alcohol content, acetaldehyde content, and the ratio of phenethyl alcohol content to acetaldehyde content of the samples 1 to 6 were shown in Table below. Note that the percentage of alcohol of the extracts (samples 4 to 6) were shown in Table below.

Each of the samples 1 to 6 was added to non-alcoholic lemon sour at 0.1% (v/v). The percentage of alcohol in the non-alcoholic lemon sour was at least 0.0441% (v/v) or less. The non-alcoholic lemon sour was subjected to sensory evaluation by trained professional panelists in the same manner as in Example 1.

TABLE 3

| Sample No. | 1 | 2 | 3 | 4 | 5 | 6 |
|---|---|---|---|---|---|---|
| Alc content (%, v/v) | 44.1 | 44.1 | 44.1 | 0.5 | 0.2 | 0.4 |
| Phenethyl alcohol (ppm) | 39.2 | 74.1 | 63.3 | 410.0 | 389.5 | 224.5 |
| Acetaldehyde (ppm) | 94.2 | 143.9 | 46.1 | 10.4 | 14.2 | 7.1 |
| Phenethyl alcohol/acetaldehyde | 0.42 | 0.51 | 1.37 | 39.31 | 27.49 | 31.67 |
| Alc content of sensory evaluation object (%, v/v) | 0.0441 | 0.0441 | 0.0441 | 0.0005 | 0.0002 | 0.0004 |
| Evaluation | 1.0 | 1.0 | 1.0 | 4.0 | 4.0 | 4.0 |

Alc: Alcohol

The evaluation shown in the Table is an average score of the evaluation by the professional panelists. An average score of 1.5 or more was considered acceptable.

It was confirmed that the ratio of phenethyl alcohol content to acetaldehyde content (phenethyl alcohol content/acetaldehyde content) was an effective indicator to evaluate the liquor taste of the non-alcoholic beverage when whisky was used as an ingredient of the extract.

It was also confirmed that a liquor taste was given to the non-alcoholic beverage by using an extract having a ratio of phenethyl alcohol content to acetaldehyde content (phenethyl alcohol content/acetaldehyde content) of 14 or more.

When considered in conjunction with the results of other Examples, the ratio of phenethyl alcohol content to acetaldehyde content (phenethyl alcohol content/acetaldehyde content) can be used as an indicator to evaluate or improve the liquor taste of the non-alcoholic beverage, regardless of which alcoholic beverage is used as an ingredient of the extract.

[Measurement Method]

(1) Method for Measuring Phenethyl Alcohol, Acetaldehyde, and Acetic Acid

Phenethyl alcohol, acetaldehyde, and acetic acid were measured by gas chromatography set under conditions described below.

Phenethyl Alcohol

- Instrument: GC 6890N (Agilent Technologies)
- Column: HP-ULTRA2 (manufactured by J&W Scientific), internal diameter: 0.32 mm,
- length: 50 m, film thickness: 0.52 μm
- Carrier gas: Helium
- Flow: 2.5 mL/min
- Inlet: Split
- Split Ratio: 15:1
- Inlet temp.: 250° C.
- Oven temp.: 40° C. (5 min)→10° C./min→230° C. (10 min)
- Detector: FID
- Det. temp.: 260° C.
- Injection volume: 2.0 microliters Acetaldehyde

- Instrument: GC 6890N (Agilent Technologies)
- Column: SUPELCO 5% CARBOWAX 20M on 80/120 Carbopack B AW8 FT×¼ IN×2 mm ID GLASS Packed Column
- Carrier gas: $N_2$
- Flow: 18.8 mL/min
- Inlet temp.: 200° C.
- Oven temp.: 70° C. (0.0 min)→4° C./min→154° C. (10 min)
- Detector: FID
- Det. temp.: 210° C.
- Injection volume: 1.0 microliters Acetic Acid

- Instrument: GC 6890N (Agilent Technologies)
- Column: HP-FFAP (manufactured by J&W Scientific), internal diameter: 0.32 mm, length: 50 m, film thickness: 0.50 μm Carrier gas: Helium
Flow: 2.8 mL/min
Inlet: Split
Split Ratio: 15:1
Inlet temp.: 230° C.
Oven temp.: 100° C. (0.6 min)⇒5° C./min⇒210° C. (20 min)
Detector: FID
Det. temp.: 240° C.
Injection volume: 2.0 microliters (2) Method of Measuring Alcohol Alcohol was measured by measuring specific gravity at 15° C. with a density/specific gravity meter (DA-650, manufactured by Kyoto Electronics Manufacturing Co., Ltd.), and the measured specific gravity is converted to the percentage of alcohol by using Table 2 which is titled "Conversion Between Alcohol Content and Density (15° C.) or Specific Gravity (15/15° C.)" and annexed to Analysis Methods Prescribed by the National Tax Agency (National Tax Agency Directive No. 6 in 2007, revised Jun. 22, 2007).

The invention claimed is:

1. An extract comprising phenethyl alcohol and acetaldehyde,
 wherein a quotient of phenethyl alcohol content to acetaldehyde content (phenethyl alcohol content/acetaldehyde content) is 20 to 900,
 wherein the phenethyl alcohol content is 50 ppm to 1,000 ppm,
 wherein the acetaldehyde content is 1 ppm to 500 ppm,
 wherein the extract is an extract of alcoholic drink selected from the group consisting of distilled liquor, brewed liquor, and mixed liquor, and
 wherein the brewed liquor is selected from the group consisting of wine, and Japanese sake.

2. The extract according to claim 1, further comprising acetic acid at 100 ppm to 600 ppm.

3. The extract according to claim 1, having a pH of 4.5 or less.

4. The extract according to claim 1, having a Brix of less than 8.0.

5. The extract according to claim 1, wherein the distilled liquor is shochu (Japanese distilled spirit) or whisky.

6. The extract according to claim 5, wherein the shochu (Japanese distilled spirit) is mugi shochu (Japanese distilled spirit made from barley).

7. The extract according to claim 1, which is a liquor-taste improving agent.

8. The extract according to claim 1, which is an astringent-taste improving agent.

9. A method for producing an extract, comprising the steps of:
 distilling an alcoholic drink under reduced pressure;
 obtaining a residual liquid resulting from the reduced-pressure distillation, wherein
 the extract comprises phenethyl alcohol and acetaldehyde,
 the extract has a quotient of phenethyl alcohol content to acetaldehyde content (phenethyl alcohol content/acetaldehyde content) is 20 to 900,
 the phenethyl alcohol content is 50 ppm to 1,000 ppm,
 the acetaldehyde content is 1 ppm to 500 ppm,
 the extract is an extract of alcoholic drink selected from the group consisting of distilled liquor, brewed liquor, and mixed liquor, and
 the brewed liquor is selected from the group consisting of wine, and Japanese sake.

10. The production method according to claim 9, wherein the residual liquid is prepared without adding water.

11. The production method according to claim 9, wherein the distilled liquor is shochu (Japanese distilled spirit) or whisky.

12. The production method according to claim 11, wherein the shochu (Japanese distilled spirit) is mugi shochu (Japanese distilled spirit made from barley).

13. The production method according to claim 9, wherein the reduced-pressure distillation is performed under conditions of a pressure in a vessel of 300 mmHg or less and a distillation temperature of 20 to 60° C.

14. The production method according to claim 9, wherein the reduced-pressure distillation is performed such that the residual liquid has an alcohol content of 1% (v/v) or less.

15. The production method according to claim 9, wherein the reduced-pressure distillation is performed such that the residual liquid has an alcohol content of 1% (v/v) to 60% (v/v).

16. A method for producing a beverage, comprising the step of blending an extract obtained by the method for producing an extract according to claim 9.

17. A beverage comprising the extract according to claim 1.

18. The beverage according to claim 17, which is a non-alcoholic beverage.

19. The beverage according to claim 17, which is a carbonated beverage.

20. The extract according to claim 1, wherein the phenethyl alcohol content is 150 ppm to 800 ppm.

21. The extract according to claim 1, wherein the acetaldehyde content is 60 ppm to 400 ppm.

* * * * *